(12) United States Patent
Fincher (10) Patent No.: US 10,206,373 B1
(45) Date of Patent: Feb. 19, 2019

(54) DOUBLE-ENDED PET TOY

(71) Applicant: Derek Skye Fincher, Jensen Beach, FL (US)

(72) Inventor: Derek Skye Fincher, Jensen Beach, FL (US)

( * ) Notice: Subject to any disclaimer, the term of this patent is extended or adjusted under 35 U.S.C. 154(b) by 304 days.

(21) Appl. No.: 15/339,584

(22) Filed: Oct. 31, 2016

Related U.S. Application Data (60) Provisional application No. 62/255,623, filed on Nov. 16, 2015.

(51) Int. Cl.
*A01K 15/02* (2006.01)

(52) U.S. Cl.
CPC ................... *A01K 15/026* (2013.01)

(58) Field of Classification Search
CPC ..... A01K 15/025; A01K 15/026; A63H 33/00
USPC .................. 119/707, 709; 446/490
See application file for complete search history.

(56) References Cited

U.S. PATENT DOCUMENTS

| | | | | |
|---|---|---|---|---|
| 3,830,202 A | * | 8/1974 | Garrison | A01K 15/025 |
| | | | | 119/709 |
| 3,907,287 A | * | 9/1975 | Fox | A63B 69/0088 |
| | | | | 473/424 |
| 4,139,966 A | * | 2/1979 | Connell | A63J 21/00 |
| | | | | 446/242 |
| 4,147,353 A | * | 4/1979 | Moore | A63B 69/0079 |
| | | | | 473/575 |
| 4,321,888 A | * | 3/1982 | Topliffe | A01K 15/025 |
| | | | | 119/709 |
| 4,561,919 A | | 12/1985 | Forsyth | |
| 4,729,747 A | * | 3/1988 | Yeh | A63H 33/00 |
| | | | | 446/27 |
| 4,784,391 A | * | 11/1988 | Herron | A63B 67/10 |
| | | | | 273/109 |
| 4,930,448 A | | 6/1990 | Robinson | |
| 4,967,321 A | * | 10/1990 | Cimock | A63H 33/00 |
| | | | | 362/101 |
| 5,092,272 A | * | 3/1992 | O'Rourke | A01K 15/026 |
| | | | | 119/709 |
| 5,148,769 A | | 9/1992 | Zelinger | |
| 5,329,881 A | | 7/1994 | O'Rourke | |
| 5,436,076 A | | 7/1995 | Nakata et al. | |
| D382,382 S | * | 8/1997 | Weinacker, Jr. | D30/160 |
| 5,657,721 A | | 8/1997 | Mayfield et al. | |
| 5,755,184 A | | 5/1998 | Neidenberger | |
| 5,865,146 A | * | 2/1999 | Markham | A01K 15/026 |
| | | | | 119/707 |

(Continued)

FOREIGN PATENT DOCUMENTS

| | | | | |
|---|---|---|---|---|
| CA | 2715957 A1 | * | 3/2012 | ........... A01K 15/025 |
| DE | 202010013828 U1 | * | 1/2012 | ........... A01K 15/025 |
| EP | 1602275 A1 | * | 12/2005 | ........... A01K 15/025 |

*Primary Examiner* — Magdalena Topolski
*Assistant Examiner* — Morgan T Barlow
(74) *Attorney, Agent, or Firm* — H. John Rizvi; John Rizvi, P.A.

(57) ABSTRACT

A double-ended pet toy which is suitable for entertaining a pet and, optionally, a pet's caregiver, while providing different structures that move in a different manner and on which the pet can chew for cleaning of the pet's teeth. An illustrative embodiment of the double-ended pet toy includes an elongated, bendable main body; a pair of end cords extending from respective ends of the main body; and a pair of pom-poms terminating the pair of end cords, respectively.

16 Claims, 5 Drawing Sheets

(56) References Cited

U.S. PATENT DOCUMENTS

| | | | | |
|---|---|---|---|---|
| D410,971 S | * | 6/1999 | Young | D21/398 |
| 6,250,254 B1 | | 6/2001 | Weinacker | |
| 6,474,260 B1 | * | 11/2002 | Shultz | A01K 5/00 119/51.03 |
| 6,490,998 B1 | * | 12/2002 | Rocher | A01K 15/025 119/702 |
| 6,601,539 B1 | * | 8/2003 | Snook | A01K 15/026 119/710 |
| D500,902 S | * | 1/2005 | Crane | D30/160 |
| D505,233 S | * | 5/2005 | Viola | D30/160 |
| D513,816 S | * | 1/2006 | Crane | A01K 15/025 D30/160 |
| D514,753 S | * | 2/2006 | Crane | D1/199 |
| D515,253 S | * | 2/2006 | Viola | A01K 15/026 D1/199 |
| 7,115,051 B2 | * | 10/2006 | Hansberry | A63B 69/0002 473/423 |
| D546,507 S | * | 7/2007 | Byrne | A01K 15/025 D30/160 |
| 7,373,902 B2 | * | 5/2008 | Levan | A01K 15/025 119/702 |
| 7,461,500 B2 | * | 12/2008 | Theis | D07B 1/145 57/238 |
| 7,543,550 B2 | | 6/2009 | Simpson | |
| D601,761 S | * | 10/2009 | Lamstein | D30/160 |
| 7,833,115 B2 | * | 11/2010 | Abel | A63B 43/007 473/508 |
| 7,878,151 B2 | * | 2/2011 | Tsengas | A01K 15/025 119/707 |
| D635,309 S | * | 3/2011 | Axelrod | D30/160 |
| 8,181,606 B1 | * | 5/2012 | Kirschbaum | A01K 15/025 119/707 |
| 8,413,611 B2 | * | 4/2013 | Axelrod | A01K 15/026 119/709 |
| 8,978,591 B2 | * | 3/2015 | Cogswell | A01K 15/027 119/708 |
| D728,171 S | * | 4/2015 | Byrne | A63H 1/30 D30/160 |
| D728,713 S | * | 5/2015 | Phillips | A01K 15/025 D21/707 |
| D741,555 S | * | 10/2015 | Byrne | A01K 15/026 D30/160 |
| D789,001 S | * | 6/2017 | Byrne | A63H 33/00 D30/160 |
| 2002/0102909 A1 | * | 8/2002 | Derraugh | A63H 33/00 446/369 |
| 2004/0011299 A1 | * | 1/2004 | Lamson-Scribner | A01K 15/025 119/708 |
| 2004/0107917 A1 | * | 6/2004 | Gerlach | A01K 15/026 119/708 |
| 2006/0260560 A1 | * | 11/2006 | Renforth | A01K 15/025 119/707 |
| 2007/0215063 A1 | * | 9/2007 | Simpson | A01K 15/025 119/708 |
| 2007/0234969 A1 | * | 10/2007 | Lynch | A01K 15/02 119/707 |
| 2007/0283899 A1 | * | 12/2007 | Genitrini | A01K 15/025 119/708 |
| 2008/0132144 A1 | * | 6/2008 | Chernick | A63H 1/30 446/486 |
| 2009/0000565 A1 | * | 1/2009 | Bryce | A01K 15/025 119/707 |
| 2009/0007854 A1 | * | 1/2009 | Cooper | A01K 15/025 119/707 |
| 2009/0277395 A1 | * | 11/2009 | Jager | A01K 15/025 119/707 |
| 2011/0017148 A1 | * | 1/2011 | Tsengas | A01K 15/025 119/707 |
| 2011/0277695 A1 | * | 11/2011 | Smith | A01K 15/026 119/707 |
| 2011/0277697 A1 | | 11/2011 | Lipscomb | |
| 2012/0145089 A1 | * | 6/2012 | Markham | A01K 15/026 119/707 |
| 2012/0252308 A1 | * | 10/2012 | Karsten | A63H 3/48 446/97 |
| 2013/0047931 A1 | * | 2/2013 | Lai | A01K 15/026 119/710 |
| 2013/0192536 A1 | * | 8/2013 | Lohmann | A01K 15/025 119/707 |
| 2013/0340684 A1 | * | 12/2013 | Townsend | A01K 15/025 119/708 |
| 2014/0216357 A1 | * | 8/2014 | Wechsler | A01K 15/026 119/707 |
| 2014/0299070 A1 | * | 10/2014 | Harrington | A01K 15/025 119/707 |
| 2015/0068467 A1 | * | 3/2015 | Chirico | A01K 15/025 119/707 |
| 2015/0090193 A1 | * | 4/2015 | Giarrizzo | A01K 15/026 119/709 |
| 2015/0237829 A1 | * | 8/2015 | Tsengas | A01K 15/025 119/709 |

* cited by examiner

DOUBLE-ENDED PET TOY

CROSS-REFERENCE TO RELATED APPLICATIONS

This application claims the benefit of U.S. Provisional Patent Application Ser. No. 62/255,623, filed Nov. 16, 2015, which is incorporated by reference herein in its entirety.

FIELD OF THE INVENTION

The present invention relates generally to pet toys, and more particularly, to a double-ended pet toy which is suitable for entertaining a pet and the pet's caregiver while providing different structures which the pet can chew for cleaning of the pet's teeth, as well as randomly movable ends which the pet can be amused with and pounce on.

BACKGROUND OF THE INVENTION

Many types of pet animals, particularly cats, have hunting instincts which they often exercise by playing with objects. Pet toys which undergo random motion to elicit stalking, capturing and killing reactions from a pet are known. Alternatively or additionally, pet toys may include bells or other objects which make a noise when the toy is moved by a person who plays with the pet, or when the pet itself shoves the toy around. After a short period of time, however, the pet may lose interest in the toy since the pet's attention may be lost, for instance when the pet's caregiver no longer engages in moving the toy.

Pet toys range in complexity. For instance, pet toys may range from a simple straw or string to a wind-up toy which resembles the appearance of a mouse or other small animal and travels on a flat surface. Everyday objects, such pipe cleaners, may hold a pet's attention for a long time. However, many types of pet toys may have a uniform structure or may move in the same repetitive motion which may cause the pet to lose interest in the toy after a period of time.

Ideally, pet toys do not only entertain a pet. Instead, they also contribute to keep the pet agile and healthy. For instance, some pet toys such as chewable toys may contribute to maintain the pet's dental health. While some pets, such as dogs, may benefit from regular dental care, in which pet caregivers may regularly brush a pet's teeth to prevent decay and gum disease, the reality is that brushing of a pet's teeth may be cumbersome and may be resisted by the pet. Consequently, caregivers may neglect the regular cleaning of a pet's teeth, potentially leading to tooth decay. Chewing on pet toys may clean and strengthen a pet's teeth, potentially averting tooth decay.

The present invention seeks to provide an improved pet toy that offers a wide variety of structures and movements and contributes to keep the pet amused and motivated while playing with the toy. In addition, a pet toy is sought that provides heterogeneous structures which the pet can chew for cleaning of the pet's teeth.

SUMMARY OF THE INVENTION

The present invention is directed to a double-ended pet toy which can be used to entertain a pet and the pet's caregiver while providing different structures which the pet can chew for cleaning of the pet's teeth. The double-ended pet toy may include an elongated, flexible main body. A pair of end cords may extend from opposite ends of the main body. A pom-pom may terminate each of the pair of end cords. Accordingly, a pet caregiver can manipulate the main body into any of a variety of configurations and grasp the main body to move one or both of the pom-poms and attract the attention of a pet. The pet can stalk, chase, bat at and/or wrestle with the moving pom-poms. The main body, the end cords and the pom-poms provide different structures which the pet can chew when not chasing or stalking the pom-poms.

In a first implementation of the invention, a double-ended pet toy comprises an elongated, flexible main body having two opposite ends, and a pair of flexible end cords, each end cord secured to a respective end of the two opposite ends of the main body. The pet toy further includes a pair of pom-poms, each pom-pom carried by a respective cord of the pair of flexible end cords.

In a second aspect, the flexible main body can include opposite end portions which are wider than respective sections of the flexible main body adjacent to the opposite end portions. The wider, opposite end portions provide biting regions or structure for the pet to focus their playful activity on. Alternatively or additionally, each end cord can include a proximal end and a distal end, the proximal end of the end cord arranged closer to the respective end of the flexible main body than the distal end of the end cord. The proximal end of at least one of the end cords can be wider than an adjacent section of the at least one of the end cords, in order for the proximal end to provide a biting region for the pet to chew on or play with. Optionally, a cord connector can secure the wider end portion of the flexible main body to the wider proximal end portion of the corresponding end cord. In some embodiments, the cord connector can secure the end portion of the flexible main body in a spaced-apart relationship with the proximal end portion of the corresponding end cord, to render both wider end portions more distinct. The cord connector can conceal the end portion of the flexible main body and the proximal end portion of the corresponding end cord, to protect the end portions as well as the pet's mouth.

In another aspect, the flexible main body can include an elongated flexible inner core and an outer flexible sheath concealing the core. Opposite ends of the outer flexible sheath can be tied into a respective knot to secure the core within the sheath.

In yet another aspect, the end cords can be more flexible than the main body.

In another aspect, a cord connector can secure the end of the flexible main body to a proximal end of a corresponding end cord of the pair of flexible end cords. For instance, the corresponding end cord can be tied into a cord end knot, and the cord connector can retain the cord end knot adjacent to the end of the flexible main body, and optionally conceal the cord end knot. Alternatively or additionally, the cord connector can retain the sheath end knot adjacent to the proximal end of the corresponding end cord, and optionally conceal the sheath end knot.

In a second implementation of the invention, a double-ended pet toy comprises an elongated, flexible main body having two opposite ends, and a pair of flexible end cords, each end cord secured to a respective end of the two opposite ends of the main body. The end cords are more flexible than the main body. The pet toy further includes a pair of pom-poms, each pom-pom terminating a respective cord of the pair of flexible end cords.

In a further implementation of the invention, a pet toy comprises an elongated, flexible main body and a flexible end cord, the end core more flexible than the main body. The end cord includes a proximal end secured to an end of the main body and a free, distal end. The pet toy further includes an item carried by the end cord, the item provided with tufts of one or more fibrous materials.

In a second aspect, at least one of the end of the main body and the proximal end of the end cord are tied into a knot providing a protruding biting area.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a double-ended pet toy which is suitable for entertaining a pet, regardless of whether the pet is playing with the pet's caregiver or is playing on its own. The double-ended pet toy provides different structures that the pet can chew for cleaning of the pet's teeth, and which provide varied stimulations to the pet. The double-ended pet toy may include an elongated, bendable main body which can be held or shoved by the pet's paws, or held by a pet caregiver to move the pet toy. The double-ended pet toy further includes a pair of end cords which extend from respective ends of the elongated main body and a pair of pom-poms which terminate the pair of end cords, respectively, and move to attract the attention of the pet.

Figure 1:
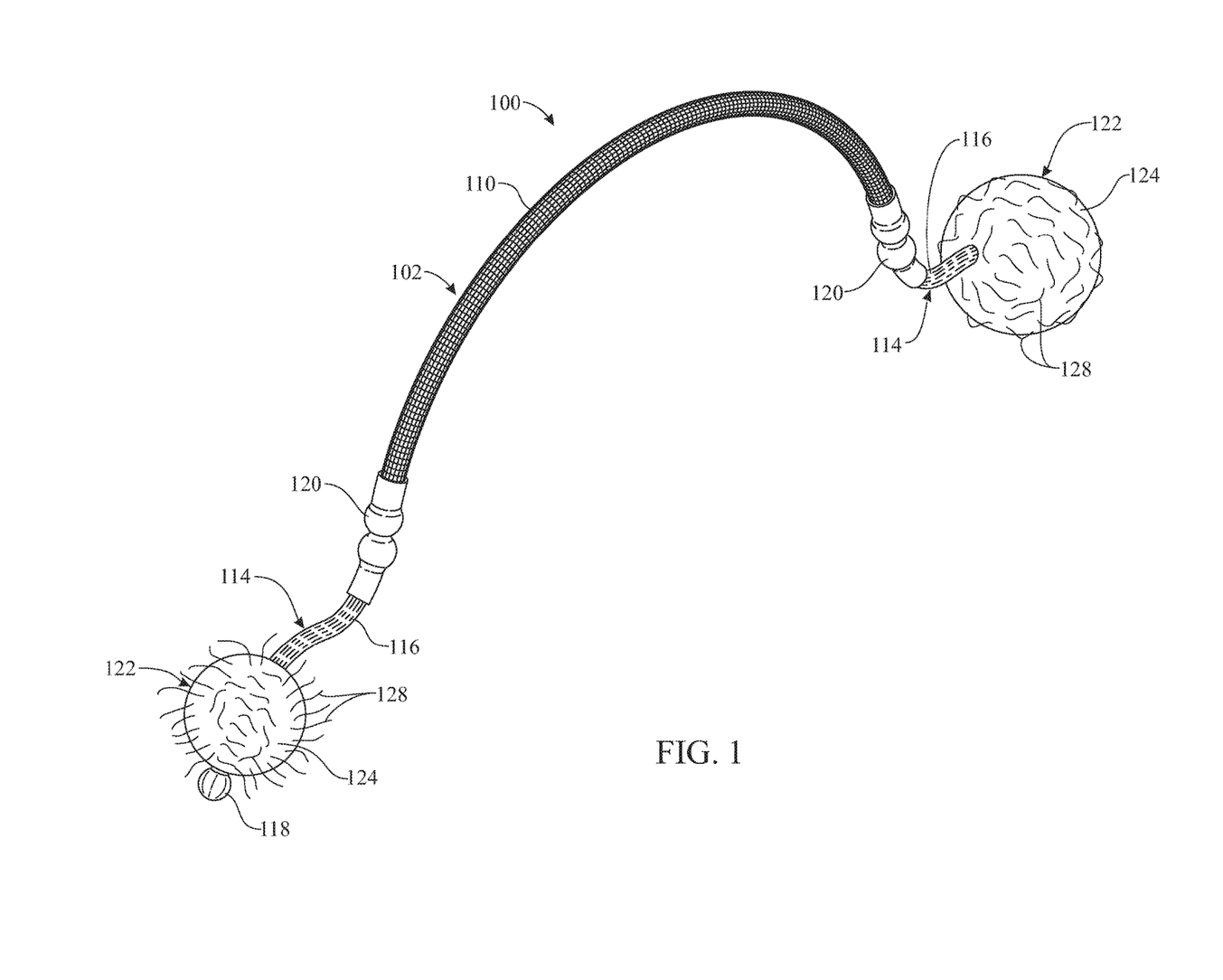
FIG. 1 presents a perspective view showing an illustrative embodiment of the double-ended pet toy of the present invention.
Figure 2:
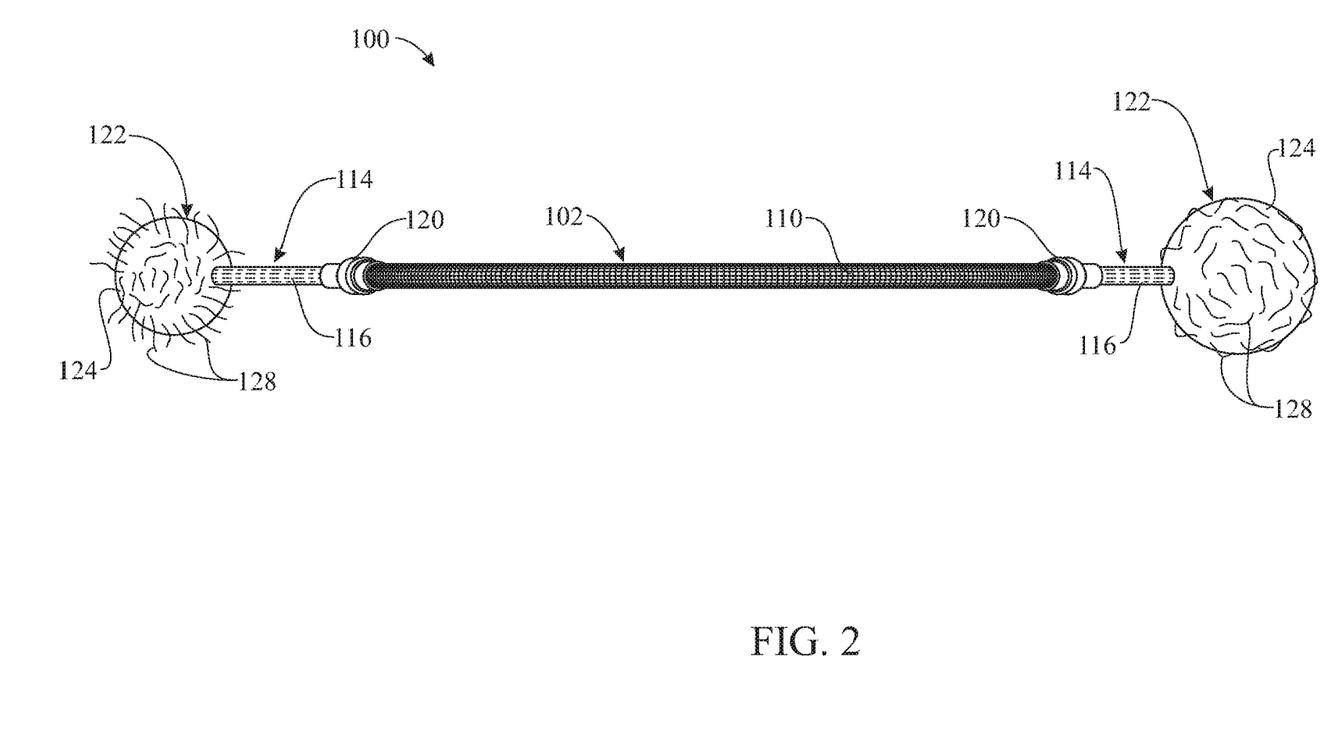
FIG. 2 presents a top view of the double-ended pet toy of the present invention.
Figure 6:
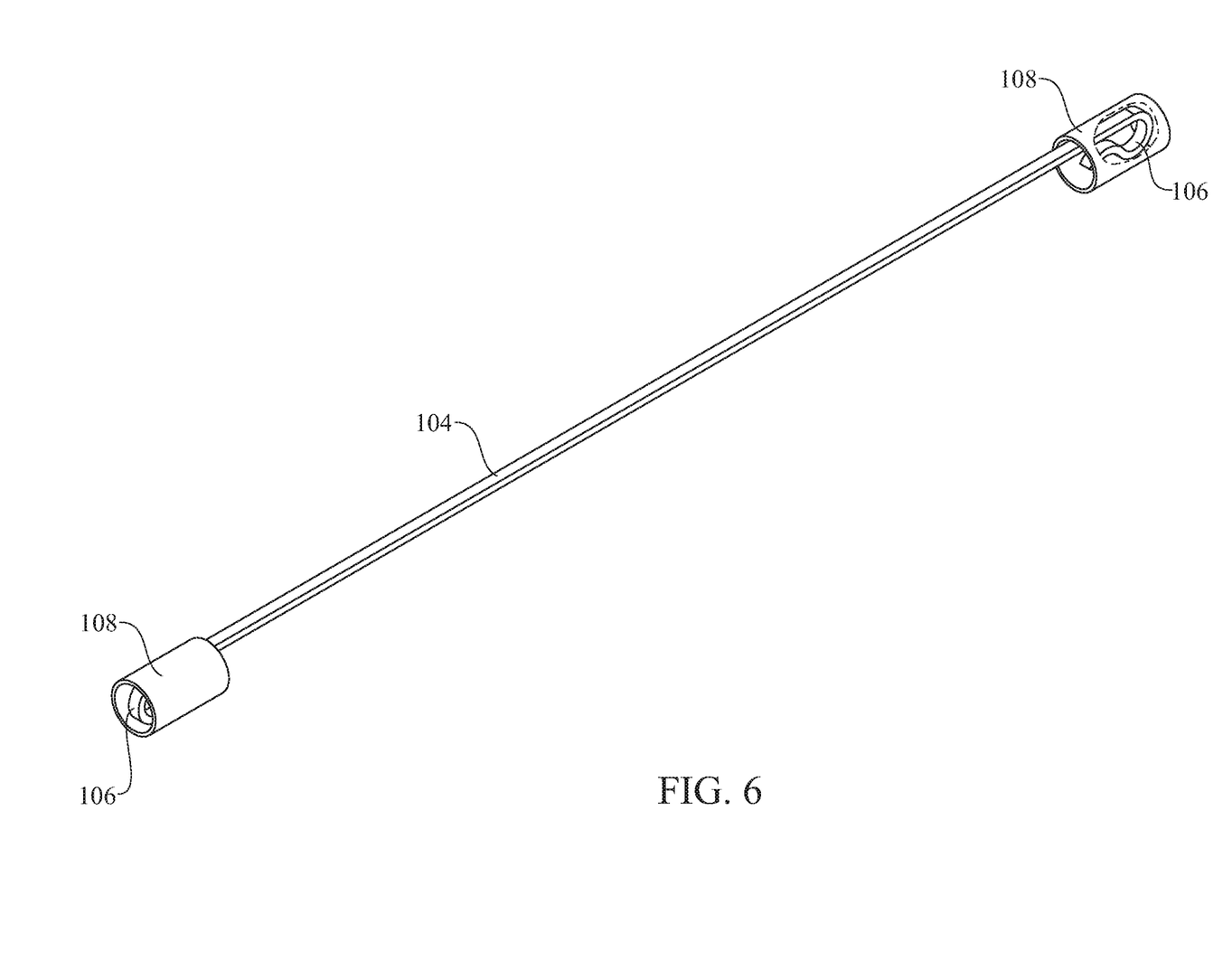
FIG. 6 presents a perspective view of the core for the main body of the double-ended pet toy.

Referring to initially to FIG. 1, an illustrative embodiment of the double-ended pet toy is generally indicated by reference numeral 100. The double-ended pet toy 100 includes a generally elongated and flexible main body 102. In some embodiments, the main body 102 may include an elongated core which can be made of an elastic, bendable material such as metal (e.g., steel), plastic or a combination thereof. For instance, the present main body 102 includes an elongated core 104 that is illustrated separately and in greater detail in FIG. 6. The elongated core 104 may have variable lengths; for instance and without limitation, the elongated core 104 may be 32-inch long. As shown in FIG. 6, the core 104 may be constructed as a rod or generally slender stem. In some embodiments, the core 104 may be terminated in opposite ends which are wider than the remainder of the core 104; for instance and without limitation, each opposite, wide end can be constructed by bending the core 104 to form a curved, looped or hooked end 106 (the latter being shown in the drawings), or the like, and by optionally arranging a cover or sleeve 108 over the hooked end 106 in order to conceal the hooked end 106 from pet's teeth and gums. The sleeve 108 can include, for instance and without limitation, a segment of food-grade plastic heat-shrink tubing or the like, which can be applied over and fitted snugly onto each corresponding hooked end 106. For instance and without limitation, each sleeve 108 may include a 0.78" diameter segment of food-grade plastic heat-shrink tubing. The flexible main body 102 is thus, in summary, provided with an elongated, flexible inner core (the elongated core 104) having end portions (e.g., the combination of the curved, looped or hooked ends 106 and sleeves 108) that are wider than the remainder of the core.

Figure 5:
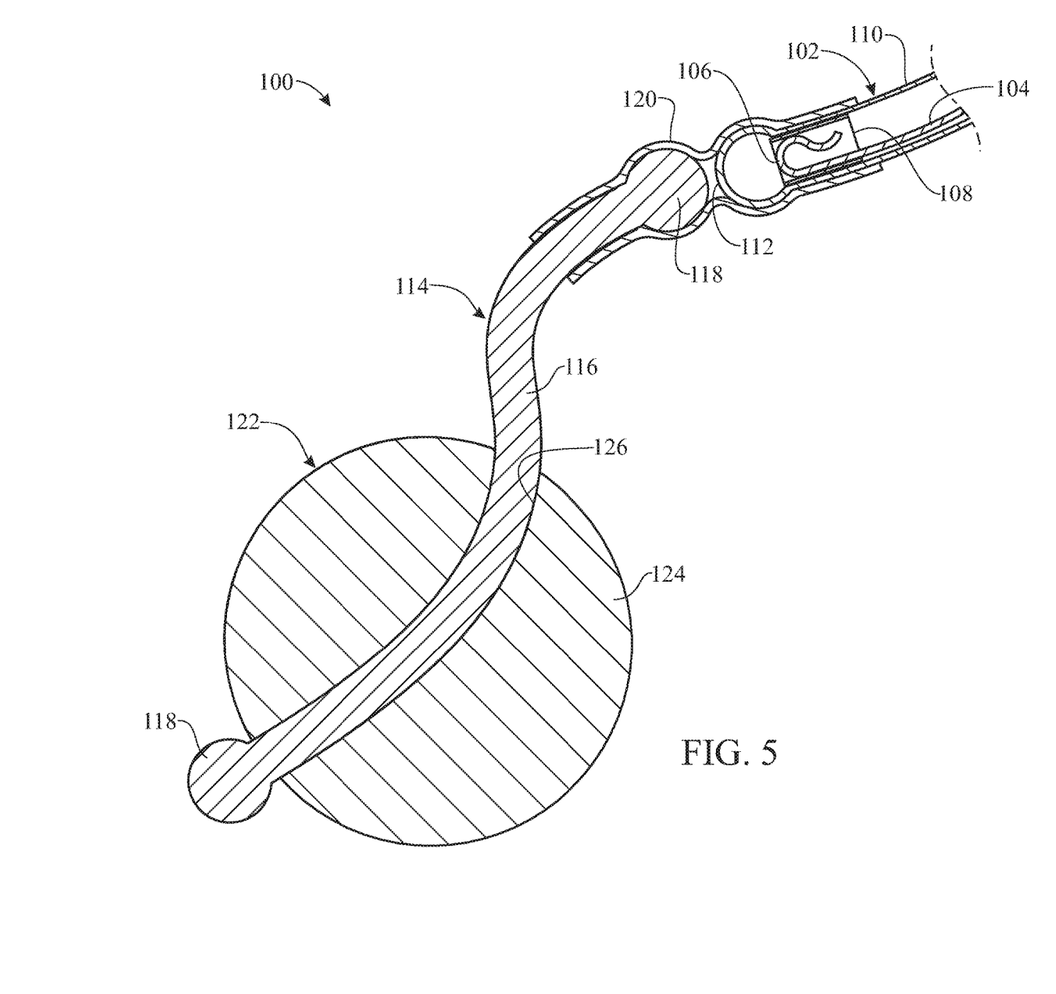
FIG. 5 presents a cross-sectional view of the main body, the cord connector, the end cord and the pom-pom on an end portion of the double-ended pet toy.

As best shown in FIG. 1, an elongated sheath 110 may enclose the core 104 of the main body 102. The sheath 110 may be fabricated of a flexible fabric material. For example and without limitation, in some embodiments, the sheath 110 may include nylon. As illustrated in FIG. 5, a sheath end knot 112 (schematically depicted as a spherical end portion, in order not to obscure the drawing) may be formed in each end of the sheath 110; in other words, the sheath may be tied into a knot at each end thereof. The sheath end knot 112 prevents the core 104 from eventually slipping out of the elongated sheath 110. In alternative embodiments, the elongated sheath 110 may be terminated by alternative closures such as a stitching, a welding, an adhered closure or the like.

Turning again to FIG. 1, a flexible end cord 114 can be arranged in continuation of each opposite end of the elongated main body 102. For instance, as shown in FIG. 5, a respective end cord 114 may be attached to each sheath end knot 112 on the sheath 110. The end cord 114 may be fabricated of any suitable flexible cord material. For example and without limitation, in some embodiments, each end cord 114 may include a nylon cord (e.g. a 50" 325-lb nylon parachute cord). In some embodiments, the end cords 114 are manufactured in a different material than the sheath 110, to provide a different feel to the pet. As illustrated in FIG. 5, each end cord 114 may include an elongated cord body 116 and a pair of cord end knots 118 (schematically depicted as spherical end portions) which terminate respective ends of the cord body 116; i.e., each end of the elongated cord body 116 may be tied into a knot to form the respective cord end knots 118.

Each end cord 114 may be attached to the corresponding end of the sheath 110 using any suitable attachment technique which is known by those skilled in the art. For example and without limitation, in some embodiments, the cord end knot 118 of each end cord 114 may be attached to a respective adjacent sheath end knot 112 of a corresponding end of the sheath 110, such as by a cord connector 120 that grasps or retains both end knots 112, 118 and maintains them at close proximity to one another to provide two relatively distinct biting structures or protuberances to the pet, while preferably also concealing both end knots 112, 118 from sight and protecting them from being untied by repeated use of the toy. Optionally, as shown, the end knots 112, 118 can be retained or secured in a spaced apart relationship with one another to enhance the effect of the end knots 112, 118 providing two distinct biting structures. In some embodiments, the cord connector 120 may include a segment of food-grade plastic heat-shrink tubing, such as a 0.5" long 0.196" diameter segment of food-grade plastic heat-shrink tubing.

Figure 3:
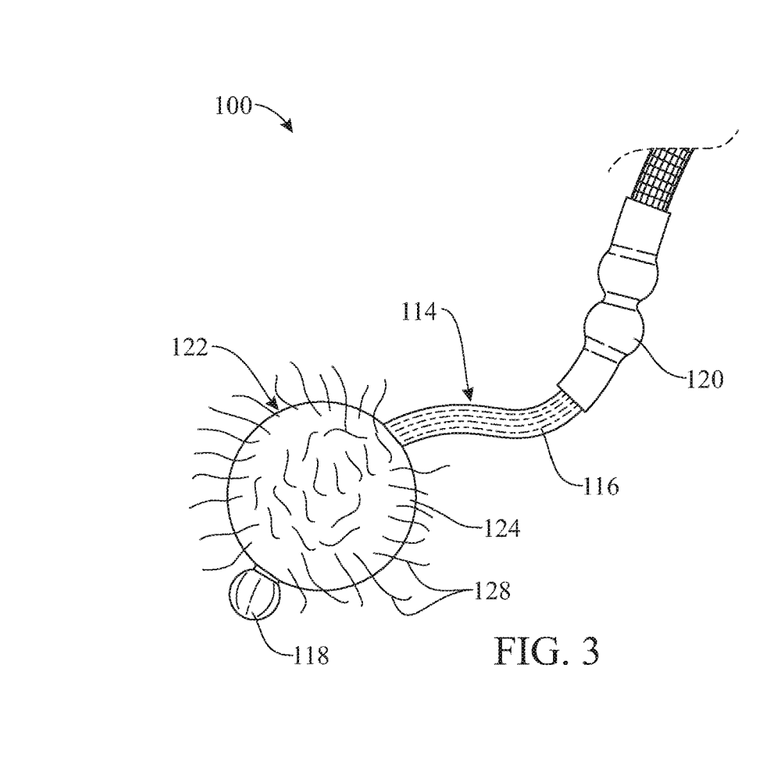
FIG. 3 presents an enlarged side view of a first end portion of the double-ended pet toy, more particularly illustrating a typical attachment structure for attaching a first end cord to a first end of the main body.
Figure 4:
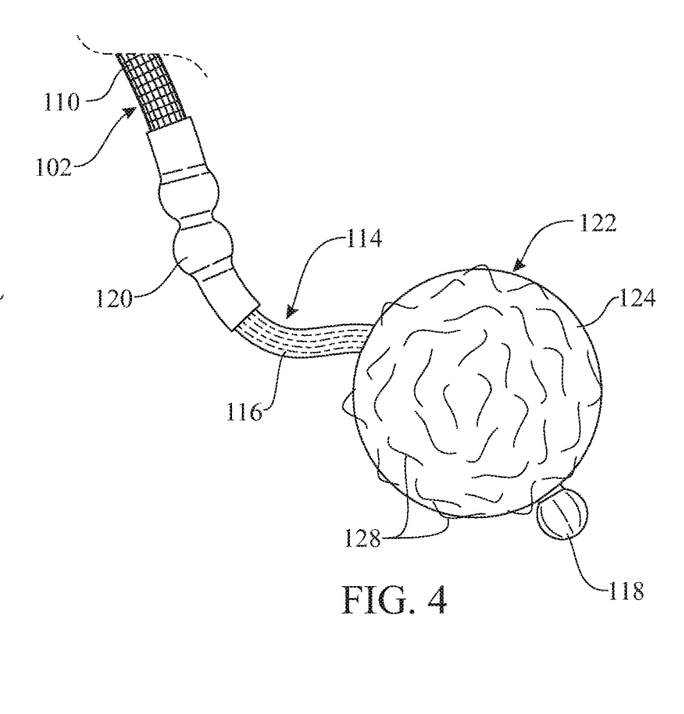
FIG. 4 presents an enlarged side view of a second end portion of the double-ended pet toy, more particularly illustrating a typical attachment structure for attaching a second end cord to a second end of the main body.

The double-ended pet toy 100 can further include a pom-pom 122 provided on each end cord 114. As illustrated in FIG. 5, each pom-pom 122 may include a pom-pom body 124 (schematically depicted as a sphere) which may be made from polyester or other suitable fibrous material. As best shown in FIGS. 3 and 4, multiple flexible pom-pom fibers or strips 128 may extend from the pom-pom body 124. Although spherical pompons have been illustrated herein, alternative embodiments are contemplated in which the pom-poms present any applicable shape (e.g., a shape of a mouse) from which fibers or strips protrude; in other embodiments, the pom-poms can be formed as tufts of fibrous material(s).

As shown in FIG. 5, a cord opening 126 may extend through the pom-pom body 124 of each pom-pom 122. The cord opening 126 may receive the elongated cord body 116 of the corresponding end cord 114. The cord end knot 118 on the distal end of the cord body 116 may retain the pom-pom 122 on the cord body 116. Each pom-pom 122 may have a size which is consistent with the functional requirements of the double-ended pet toy 100. For example, in some embodiments the pom-poms 122 may have a different diameter; in a further specific example, without limitation, one of the pom-poms 122 may have a diameter of about 1.5" and the other pom-pom 122 may have a diameter of about 2.0". In other embodiments, the pom-poms 122 may have substantially the same diameter.

Typical fabrication of the double-ended pet toy 100 may be as follows. The hooked ends 106 may be formed in the core 104, and the sleeves 108 may be applied over the core ends 106. A nylon cord forming the sheath 110 may be gutted and the core 104 inserted into the sheath 110. The sheath end knots 112 (FIG. 5) may be tied in the respective ends of the sheath 110, securing the elongated core 104 within the sheath 110. Each cord connector 120 may be applied over each sheath end knot 112 of the sheath 110 and over the cord end knot 118 on the corresponding proximal end of each corresponding end cord 114. The pom-poms 122 may be threaded onto the initially loose and untied distal ends of the respective end cords 114, typically using a sharpened tapestry needle (not illustrated), and may be secured in place by tying the cord end knot 118 in the distal end of the cord body 116. The frayed distal end of each end cord 114 may be melted to prevent further fraying.

In typical application, a pet caregiver (not illustrated) grasps the double-ended pet toy 100 at either end and waves the double-ended pet toy 100 around on the floor or in the air for the pet to chase, catch, bat and/or wrestle with the double-ended pet toy 100 until the pet or caregiver tires of the activity. It will be appreciated by those skilled in the art that the combination of the internal relatively rigid core 104 and the outside relatively softer sheath 110 may be more satisfying for pets to chew on while playing than either bare wire or cord alone. The sheath 110 may additionally protect the mouth of the pet while chewing. Moreover, the sheath 110 may protect the hands of the caregiver from being injured by the core 104 while facilitating attachment of the pom-pom 122 on each end of the double-ended pet toy 100.

The double-ended pet toy 100 may provide several options which some pets may prefer. For example, pets may rather play with the pom-poms 122 on the respective ends, the end cords 114 to which the pom-poms 122 are attached and/or widened areas of the cord connectors 120 in which the sheath end knots 112 and cord end knots 118 are encased. Accordingly, the double-ended pet toy 100 provides a total of four different feeling areas on which a pet can chew according to the pet's preference. It has been found that the sheath end knots 112 and cord end knots 118 encased in the cord connectors 120 are a particular favorite for cats since these elements provide cats with the same feeling as chewing on appliance cords and the like, and therefore, may serve as an alternative and deterrent to cats chewing on the appliance cords.

In some embodiments, the main body 102 can be more rigid than the end cords 114. This allows the end cords 114 and corresponding pom-poms 122 to move more freely than the main body 102. In consequence, when the pet or the caregiver waves or shoves the main body 102, the end cords 114 and pom-poms 122 move substantially randomly, attracting the pet's attention and greatly motivating and amusing the pet.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:
1. A double-ended pet toy comprising:
an elongated, flexible main body having two opposite ends;
a pair of flexible end cords, each end cord secured to a respective end of the two opposite ends of the main body;
a pair of pom-poms, each pom-pom carried by a respective cord of the pair of flexible end cords;
wherein, on at least one end of the two opposite ends of the flexible main body, the flexible main body terminates in an end portion that is wider than an adjacent section of the flexible main body and a corresponding end cord of the flexible end cords terminates in a proximal end portion that is wider than an adjacent section of said corresponding end cord; and a cord connector securing and concealing both the widened end portion of the flexible main body to the widened proximal end portion of the corresponding end cord.

2. The pet toy of claim 1, wherein the flexible main body comprises opposite end portions which are wider than respective sections of the flexible main body adjacent to the opposite end portions.

3. The pet toy of claim 1, wherein each end cord comprises a proximal end and a distal end, the proximal end of the end cord arranged closer to the respective end of the flexible main body than the distal end of the end cord, and further wherein the proximal end of at least one of the end cords is wider than an adjacent section of said at least one of the end cords.

4. The pet toy of claim 1, wherein the cord connector secures the end portion of the flexible main body in a spaced-apart relationship with the proximal end portion of the corresponding end cord.

5. The pet toy of claim 1, wherein the flexible main body comprises an elongated flexible inner core and an outer flexible sheath concealing the core.

6. The pet toy of claim 5, wherein opposite ends of the outer flexible sheath are tied into a respective knot to secure the core within the sheath.

7. A The pet toy of claim 5, wherein the core has ends that are wider than the remainder of the core.

8. The pet toy of claim 7, wherein the ends of the core are curved, looped or hooked to adopt a greater width than the remainder of the core.

9. The pet toy of claim 7, further comprising respective covers concealing the ends of the core that are wider than the remainder of the core.

10. The pet toy of claim 1, wherein the end cords are more flexible than the main body.

11. The pet toy of claim 1, wherein the proximal end of the corresponding end cord is tied into a cord end knot, and further wherein the cord connector retains the cord end knot adjacent to the end of the flexible main body.

12. The pet toy of claim 1, wherein the flexible main body comprises an elongated flexible inner core and an outer flexible sheath concealing the core and tied into a sheath end knot at said one or both of the two opposite ends of the flexible main body, and further wherein the cord connector retains the sheath end knot adjacent to the proximal end of the corresponding end cord.

13. The pet toy of claim 12, wherein the cord connector conceals the sheath end knot.

14. A double-ended pet toy comprising:
an elongated, flexible main body having two opposite ends;
a pair of flexible end cords, each end cord secured to a respective end of the two opposite ends of the main body, wherein the end cords are more flexible than the main body;
a pair of pom-poms, each pom-pom terminating a respective cord of the pair of flexible end cords;
wherein, on at least one end of the two opposite ends of the flexible main body, the flexible main body terminates in an end portion that is wider than an adjacent section of the flexible main body and a corresponding end cord of the flexible end cords terminates in a proximal end portion that is wider than an adjacent section of said corresponding end cord; and
a cord connector securing and concealing both the widened end portion of the flexible main body to the widened proximal end portion of the corresponding end cord.

15. A pet toy comprising:
an elongated, flexible main body;
a pair of flexible end cords, each end cord secured to a respective end of two opposite ends of the main body, wherein the end cords are more flexible than the main body, the end cord comprising a proximal end secured to an end of the main body and a free, distal end;
an item carried by each end cord, said item provided with tufts of one or more fibrous materials;
wherein at least one end of the flexible main body terminates in an end portion that is wider than an adjacent section of the flexible main body and the corresponding end cord terminates in a proximal end portion that is wider than an adjacent section of the end cord; and
a cord connector securing and concealing both the widened end portion of the flexible main body to the widened proximal end portion of the end cord.

16. The pet toy of claim 15, wherein at least one of the end of the main body and the proximal end of the end cord are tied into a knot.

* * * * *